Feb. 13, 1968   J. G. CONNINE   3,368,779
MOUNTING APPARATUS
Filed Dec. 30, 1965
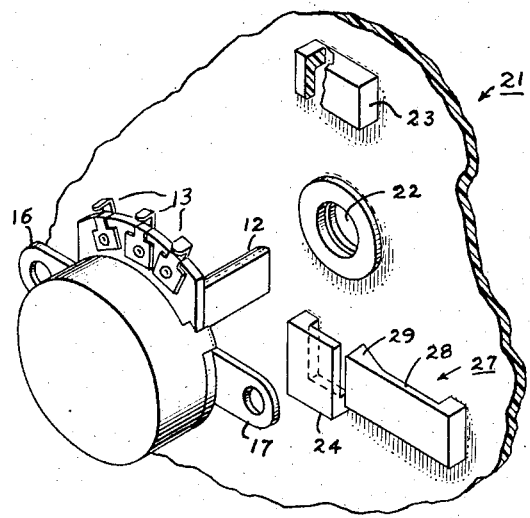
Fig. 1
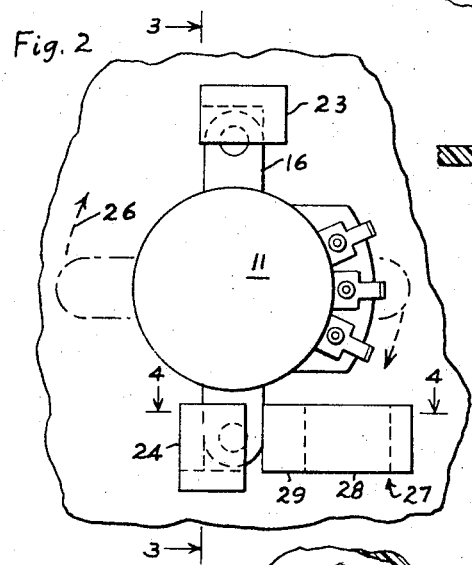
Fig. 2
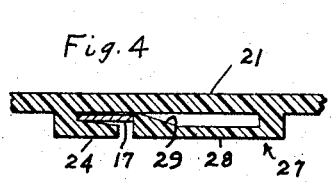
Fig. 4
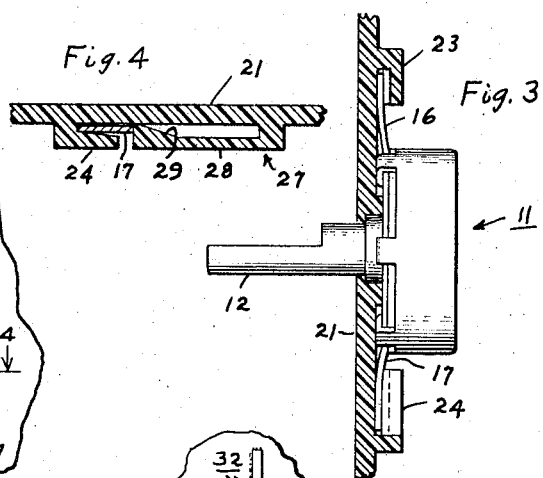
Fig. 3
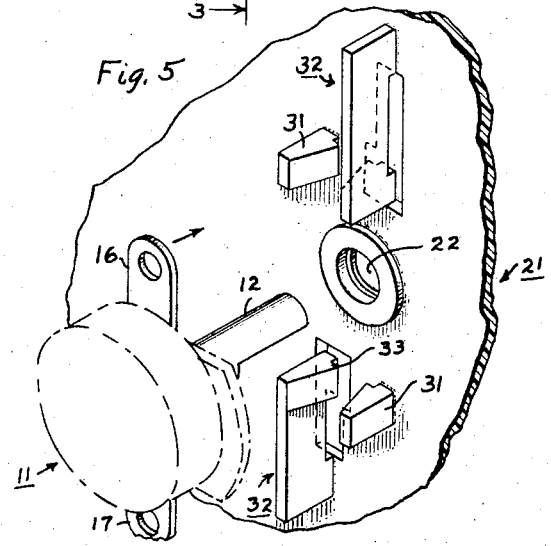
Fig. 5
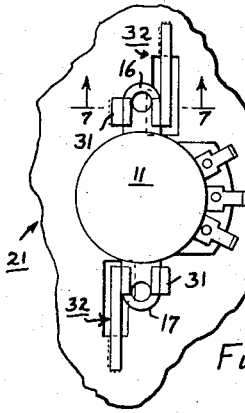
Fig. 6
Fig. 7
INVENTOR:
JOHN G. CONNINE,
BY Norman C. Fulmer
HIS ATTORNEY.

United States Patent Office 3,368,779
Patented Feb. 13, 1968

3,368,779
MOUNTING APPARATUS
John G. Connine, Sauquoit, N.Y., assignor to General Electric Company, a corporation of New York
Filed Dec. 30, 1965, Ser. No. 517,527
1 Claim. (Cl. 248—27)

ABSTRACT OF THE DISCLOSURE

A mounting apparatus for a control device having a shaft extending axially therefrom and a pair of mounting tabs extending therefrom, the apparatus including a pair of undercut brackets adapted to receive the mounting tabs and a deflectable rib adapted to lock the control device in the desired position.

This invention relates to mounting arrangements for control devices, and particularly to a mounting arrangement for a device, such as a potentiometer volume control, which has a control shaft extending therefrom.

Control devices are conventionally attached to a chassis or cabinet by fastening means such as screws, rivets, soldering, etc. These fastening means and the installation time required for them, increase the cost of manufacturing the radio, etc. in which the control device is used.

An object of the invention is to provide an improved mounting arrangement for a control device.

Another object is to provide an inexpensive and convenient mounting arrangement for a control device.

A further object is to provide a mounting arrangement for a control device, which does not require the use of, nor installation of, fastening parts.

Additional objects will be apparent from the following description and claims, and from the accompanying drawing.

The invention comprises, briefly and in a preferred embodiment, a control device of the type having a shaft extending therefrom, and also a pair of mounting tabs extending radially therefrom. A housing member, such as a radio cabinet, to which the control device is to be attached, is provided with an opening to accommodate the control shaft. A pair of brackets, formed integrally with the housing member, are adapted to accommodate the pair of tabs extending from the control device. A flexible rib is associated with at least one of the integrally formed brackets, and is adapted to deflect when the control device is being assembled to the housing member, and thereafter restores itself to a position for locking the control device in place on the housing member.

In the drawing, FIG. 1 is a perspective view of a control device and housing member in unassembled positions, in accordance with a preferred embodiment of the invention, FIG. 2 is a rear view of the parts of FIG. 1, in assembled position, FIG. 3 is a side view, partly in cross-section, taken along the line 3—3 of FIG. 2, FIG. 4 is a cross-sectional view taken on the line 4—4 of FIG. 2, FIG. 5 is a perspective view of a control device and housing member, in unassembled position, in accordance with an alternative preferred embodiment of the invention, FIG. 6 is a rear view of the parts of FIG. 5 shown in assembled position, and FIG. 7 is a cross-sectional view taken on the line 7—7 of FIG. 6.

Now referring to the embodiment shown in FIGS. 1 through 4 of the drawing, a control member 11 has a rotatable control shaft 12 extending frontwardly thereof, electrical terminals 13 thereon, and is provided with a pair of tabs 16, 17 extending radially outwardly therefrom. Preferably, the tabs 16 and 17 extend in opposite directions from the control device 11, and are relatively flat, as shown.

A housing member 21, which may be the front of a radio cabinet or the like and preferably which is made of somewhat resilient plastic material, is provided with an opening 22 for accommodating the control shaft 12. A pair of brackets 23 and 24 are provided integrally with the member 21, and preferably are molded integrally therewith. The brackets 23 and 24 are undercut and arranged as shown, so that the control device 11 can be positioned with its shaft 12 extending through the opening 22, and then rotated as indicated by the arrow 26 in FIG. 2 so that the tabs 16 and 17 rotate into positions beneath the overhanging portions of the brackets 23 and 24.

A deflectable rib 27 is provided integrally with the member 21, and is arranged to extend parallel to and spaced from the rear of the member 21, as shown at numeral 28, and the free end 29 thereof tapers toward or against the rear of the housing member 21 adjacent to one of the brackets 24. If desired, a similar flexible rib member may be associated with the other bracket 23. The tapered end 29 of the flexible rib 27 terminates near an open part of the bracket 24. Thus, when the control device 11 is being rotated into position, one of its tabs 17 passes between the flexible rib 28 and rear of the housing member 21, comes into engagement with and deflects the tapered portion 29 of the rib away from the rear of the housing member, and when the tab 17 is in position beneath the bracket 24, the tapered end 29 of the rib 28 snaps back into position adjacent to the rear surface of the housing member 21, thereby locking the control device 11 in place by preventing the tab 17 from being able to be rotated out of captivation from the bracket 24. Thus, the control device 11 is securely locked in position against rotary movement by the flexible rib 28, and is locked against axial movement by the brackets 23 and 24 in conjunction with the tabs 16 and 17. The control device can readily be removed, if desired, by inserting a screw driver blade or the like behind the flexible rib 28 and forcing it slightly outwardly, whereupon the control device 11 may be rotated and removed. Thus, the arrangement provides a quickly attachable and detachable arrangement for a control device, which does not require the use or installation of any auxiliary fastening parts.

In the embodiment illustrated in FIGS. 5 through 7, the control device 11 is the same as has been described, and an opening 22 for the control shaft 12 is provided in the housing member 21. In this embodiment, the brackets each comprise an overhanging bracket member 31 integral with the housing 21 and a flexible rib member 32 also integral with the housing member 21 and having a free end extending in spaced relation to the fixed bracket member 31, provided with an overhanging portion 33 opposite that of the fixed bracket 31. The fixed bracket 31, and the free ends of the flexible rib members 32, are tapered as shown so as to be wider apart toward the rear thereof. The flexible rib members 32 are arranged to be deflectable sideways, and to be relatively undeflectable in a direction perpendicular to the housing member 21, by shaping the rib member as shown so as to be relatively deeper than wide.

To assemble the control device of this embodiment, the control device 11 is pushed toward the rear of the housing member 21, with the shaft 12 extending through the opening 22, and with the tabs 16 and 17 in alignment with their respective mounting brackets and is pushed frontwardly thereby deflecting the flexible ribs 32 sideways, until the tabs 16 and 17 become locked beneath the undercut portions 33 of the bracket and rib members.

While a preferred embodiment of the invention has been shown and described, various other embodiments and modifications thereof will become apparent to persons skilled in the art, and will fall within the scope of the invention as defined in the following claims.

What I claim is:

1. A mounting arrangement for a control device having a control shaft extending therefrom and provided with a pair of mounting tabs extending radially therefrom, comprising a support member to which said control device is to be attached and provided with an opening to accommodate said control shaft, said support member further being provided with a pair of undercut brackets extending therefrom and adapted to respectively receive said tabs, and at least one flexible rib associated with at least one of said brackets and adapted to deflect when the control device is being assembled to the support member and thereafter restore to a position for locking one of said tabs in the undercut portion of said associated bracket, said flexible rib being attached to said support member and having a free portion spaced from said support member and extending toward the undercut portion of said associated bracket in a direction generally perpendicular to a line extending through said opening and said associated bracket, the free end of said free portion of the flexible rib being tapered toward said support member adjacent to said associated bracket, whereby the arrangement can be assembled by inserting the control shaft through the opening and rotating the control device so that a tab thereof enters the space between said flexible rib and support member, bears against said tapered end thereby deflecting the rib, and thereafter enters said associated undercut bracket, whereby said flexible rib restores to a position for locking said tab in said associated bracket.

References Cited
UNITED STATES PATENTS

| | | | |
|---|---|---|---|
| 1,876,877 | 9/1932 | Douglas | 339—127 |
| 2,056,917 | 10/1936 | Booth | 339—127 X |
| 3,215,380 | 11/1965 | Morris et al. | 248—27 |

ROY D. FRAZIER, *Primary Examiner.*

J. F. FOSS, *Assistant Examiner.*